United States Patent [19]

Newbold et al.

[11] Patent Number: 5,056,699
[45] Date of Patent: * Oct. 15, 1991

[54] BICYCLE CARRIER

[75] Inventors: Dixon Newbold, Cranston; Ned Levine, Providence, both of R.I.

[73] Assignee: Bell Helmets, Inc., Calif.

[*] Notice: The portion of the term of this patent subsequent to May 16, 2006 has been disclaimed.

[21] Appl. No.: 581,141

[22] Filed: Sep. 7, 1990

Related U.S. Application Data

[63] Continuation of Ser. No. 352,050, May 15, 1989, abandoned, which is a continuation of Ser. No. 948,333, Dec. 31, 1986, Pat. No. 4,830,250.

[51] Int. Cl.$^5$ ............................................... B60R 9/10
[52] U.S. Cl. .................................... 224/314; 224/321; 224/324
[58] Field of Search .............. 224/314, 315, 321, 324, 224/329, 309, 42.03 R, 42.03 B; 248/291, 284

[56]  References Cited

U.S. PATENT DOCUMENTS 4,332,337  6/1982  Kosecoff ...................... 224/42.03 B

FOREIGN PATENT DOCUMENTS 308725 10/1955 Switzerland ........................ 224/325

*Primary Examiner*—Renee S. Luebke
*Attorney, Agent, or Firm*—Wolf, Greenfield & Sacks

[57]  ABSTRACT

A collapsible carrier adapted for use on the rear portion of a motor vehicle has an outer frame member, an inner frame member and two support arms. The frame members and support arms depend radially from hub assemblies. The angular relationship of the frame members and support arms may be adjusted by small increments and locked at various angular relationships.

42 Claims, 3 Drawing Sheets

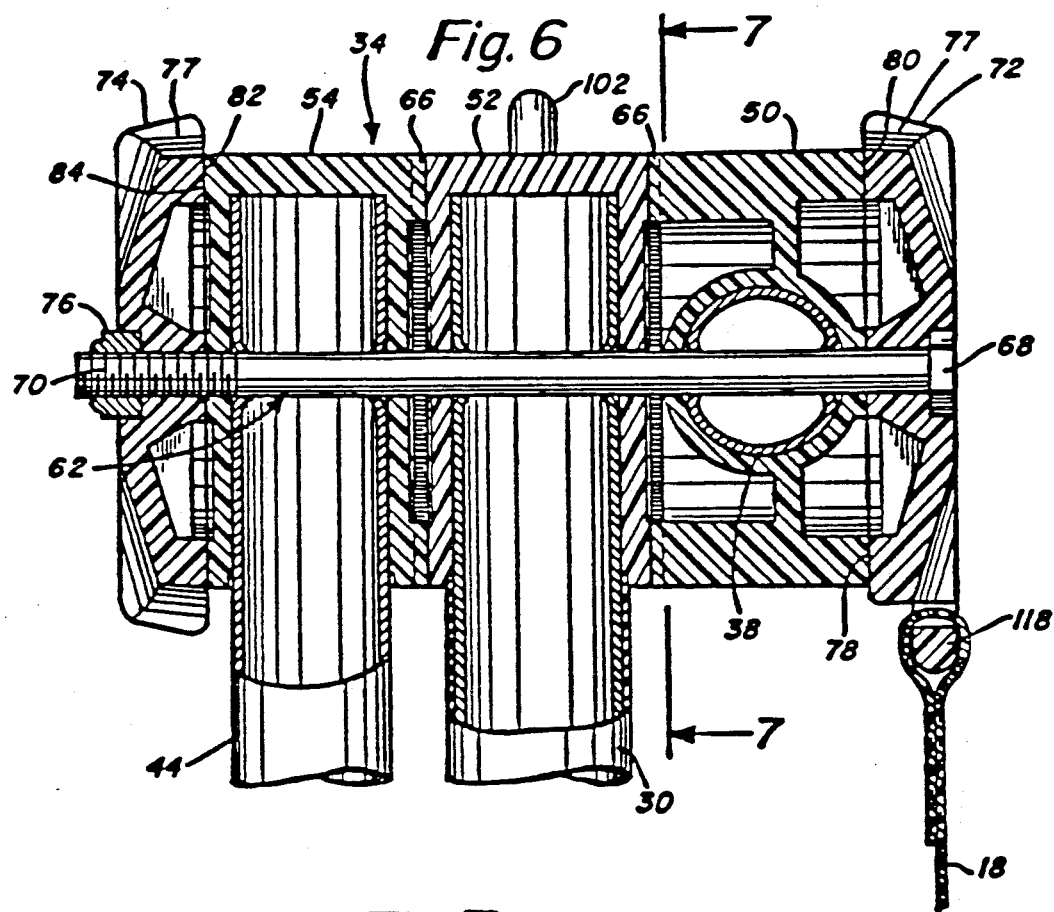
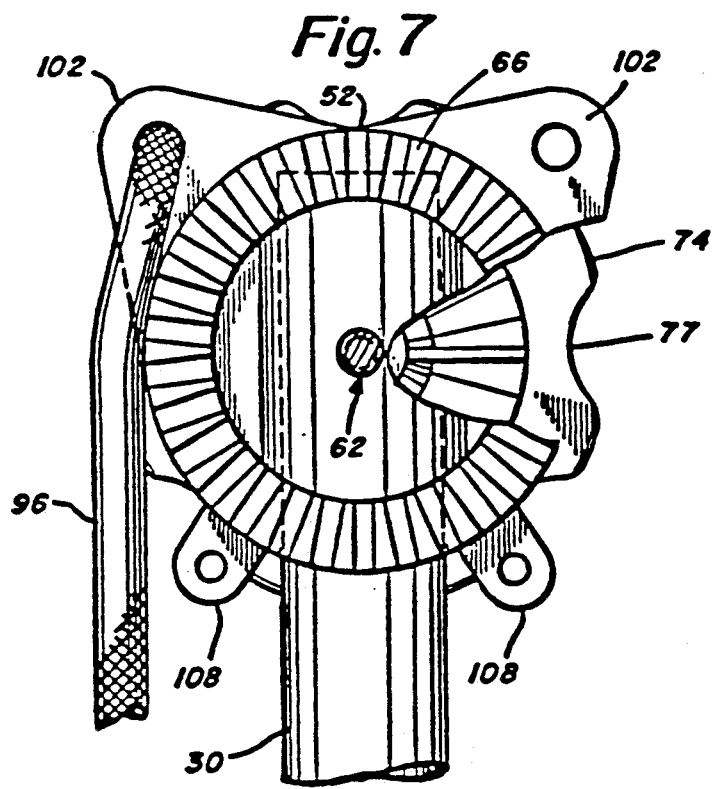

BICYCLE CARRIER

This application is a continuation of application Ser. No. 07/352,050, filed May 15, 1989, now abandoned, which is a continuation application of Ser. No. 06/948,333 filed on Dec. 31, 1986, now U.S. Pat. No. 4,830,250, the contents of both applications are hereby incorporated by reference.

BACKGROUND OF THE INVENTION

This invention relates to carriers that are designed to be attached to the outside of motor vehicles for carrying a bicycle or other objects.

Many bicycle carriers have been designed for carrying a bicycle on the back of a motor vehicle. Examples of known carries are shown in U.S. Pat. Nos. 3,710,999, 4,085,874, 4,109,839, 4,290,540, 4,332,337, 4,336,897, 4,394,948, 4,428,516, 4,452,385, 4,513,897 and 4,518,108. While these patents indicate many attempts to provide a suitable carrier for bicycles, all of the known carriers to have various drawbacks. Particularly troublesome is that known carriers are not adequately designed to attach to the rear of virtually any motor vehicle, most carriers being adapted to attach only to certain rear designs of certain motor vehicles. The invention eliminates this and other drawbacks of the prior art.

SUMMARY OF THE INVENTION

It is an object of the invention to provide a carrier capable of being secured safely to the back of virtually any motor vehicle.

Another object of the invention is to provide a carrier capable of being secured to the back of a motor vehicle having a spoiler in a manner to avoid contacting and damaging the spoiler.

Still another object of the invention is to provide a bicycle carrier having independently adjustable support arms.

Still another object of the invention is to provide a bicycle carrier that may be collapsed into substantially a single plane for convenient storage and shipment.

Yet another object of the invention is to provide a cycle carrier having frame members and bicycle support arms easily adjustable over a great range of relative angles in small discrete increments.

A carrier for use on the rear portion of a motor vehicle is provided. The carrier is adapted to be secured in a storage and in various use positions.

According to one aspect of the invention, the carrier employs a first frame member captured within a channel of a first frame hub. The frame hub has a hub radius and has projections for interengagement with another hub. Preferably a rod extends through both the frame hub and the frame member and most preferably the projections on the hub are defined by castellations arranged about the hub radius. The carrier further may be provided with a gripping disk positioned in face to face relation with the frame hub, the gripping disk constructed and arranged to provide a hand gripping surface.

According to another aspect of the invention, the carrier employs an arm for supporting a bicycle, the arm captured within a channel of an arm hub. Preferably a rod extends through both the arm hub and arm. The arm hub has projections for interengagement with a frame hub, and preferably the projections are defined by castellations. The carrier further may employ a gripping disk positioned in face to face relation with the arm hub. the gripping disk constructed and arranged to provide a hand gripping surface.

According to yet another aspect of the invention, the carrier employs a pair of hub assemblies axially aligned along a common axis, each hub assembly including hubs capable of rotating independent of one another about the common axis. The hubs have interlocking surfaces providing for incremental adjustment and locking of the hubs in various rotational relationships with respect to one another. The carrier also employs frame members connected to and radiating from the hub assemblies. Each of the frame members includes a pair of legs radiating perpendicularly to the axis of the hub assemblies and a cross bar connecting the legs to one another, and each of the frame members has a resting position. The frame members are sized such that a force is required to bring the interlocking surface of the hubs together. The frame members are further constructed and arranged such that they resume their resting position when the force is released, thereby separating the hubs to disengage the interlocking surface.

According to still another aspect of the invention, the carrier employs a pair of hub assemblies having interlocking surfaces providing for incremental adjustment and locking of the hubs in various rotational relationships with respect to one another. Frame members are connected to and radiate from the hub assemblies. This embodiment further employs gripping disks sandwiching the hubs in each hub assembly, a pair of threaded bolts, one each passing centrally through each hub assembly, and a nut threaded onto each of the bolts, whereby advancing the nuts and the bolts causes the gripping disks to move together to cause the surfaces of the hubs to interlock.

These and other features of the inventions are described and claimed below.

BRIEF DESCRIPTION OF THE DRAWINGS

FIG. 6 is a cross-section along lines 6—6 of FIG. 3 showing the hub assembly of the invention; and FIG. 7 is a cross-section along lines 7—7 of FIG. 6.

DETAILED DESCRIPTION OF THE DRAWINGS

Figure 1:
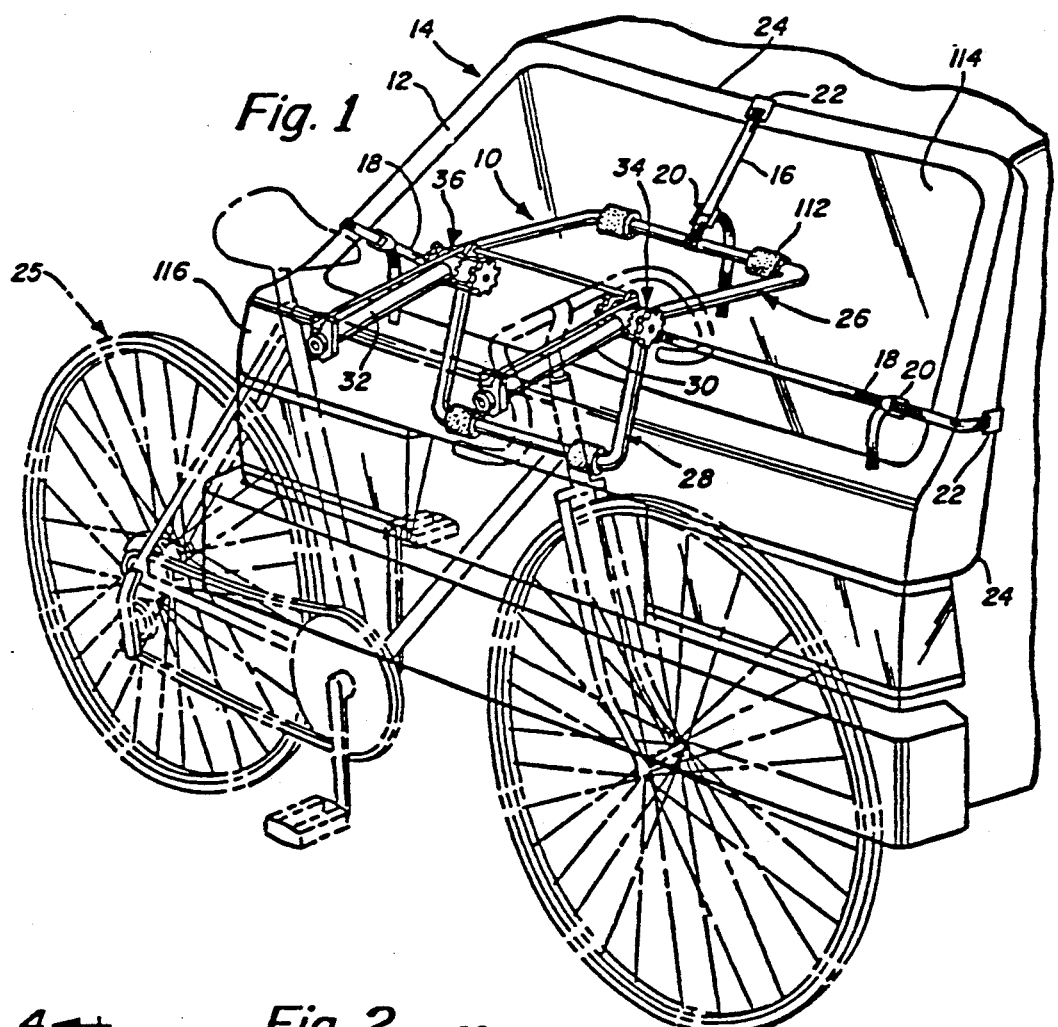
FIG. 1 shows the carrier secured to the rear of a hatchback type of motor vehicle.

FIG. 1 illustrates the preferred embodiment of the carrier 10. The carrier 10 is secured to the hatchback lid 12 of an automobile 14. Upper strap 16 and side straps 18 are attached to and extend from the carrier 10 to secure the carrier 10 to the hatchback lid 12. The straps 16, 18 include buckles 20-for adjusting the length of the straps 16, 18 and the straps terminate with attachment brackets 22, which brackets 22 are adapted to grip the outer edge 24 of a hatchback or trunk lid. A bicycle 25 depicted in a phantom image is supported by the carrier 10. The straps 16, 18, buckles 20 and attachment brackets 22 may be of any conventional design well-known to those skilled in the art and are not considered a part of the invention.

The carrier 10 has two U-shaped frame members 26, 28 and two straight support arms 30, 32. The frame members 26, 28 and support arms 30, 32 are connected at and radiate from two hub assemblies 34, 36. The hub assemblies 34, 36 define an axis about which the frame members 26, 28 and support arms 30, 32 may rotate independently.

The larger outer frame member 26 defines two legs of equal length, a first leg 38 and a second leg 40, joined at their outer end by a first crossbar 42. The smaller inner frame member 28 also defines two legs of equal length, a first leg 44 and a second leg 46, joined at their outer ends by a second crossbar 48. The legs 44, 46 and the second crossbar 48 of the inner frame member are shorter in length than the legs 38, 40 and first crossbar 42, respectively, of the outer frame member 26, such that the inner frame member 28 may be aligned to fit within the space defined by the outer frame member 26.

Figure 3:
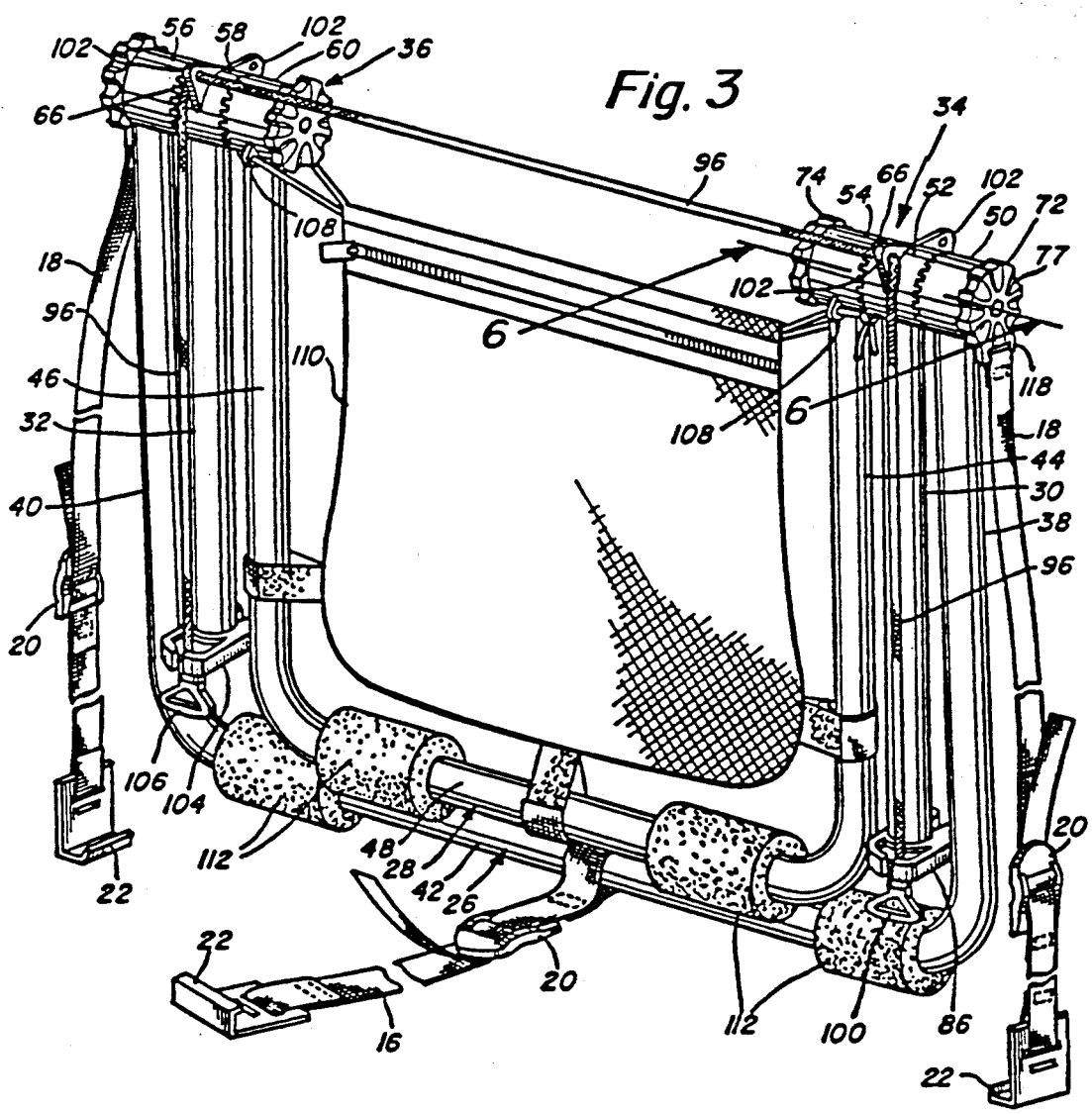
FIG. 3 shows the carrier in its folded storage or shipment arrangement.
Figure 4:
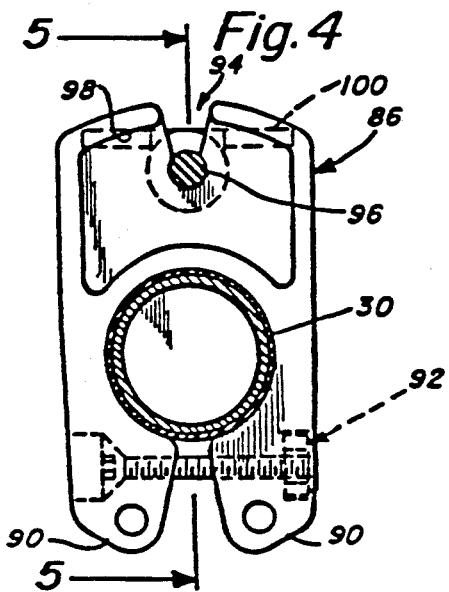
FIG. 4 is a cross-section along lines 4—4 of FIG. 2 showing a bracket attached to the support arm of the carrier.
Figure 5:
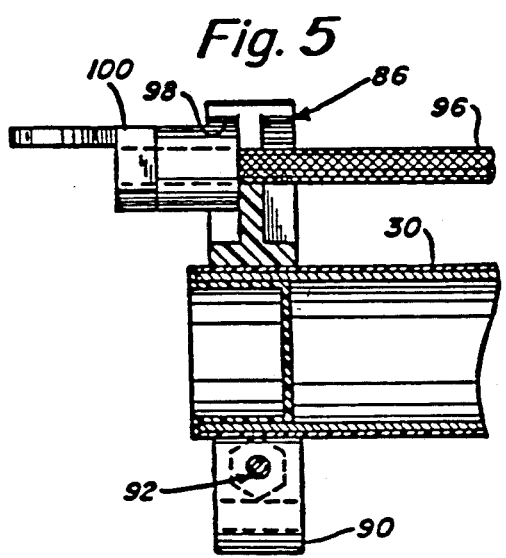
FIG. 5 is a cross-section along lines 5—5 of FIG. 4.

Referring now to FIG. 3, each of the legs of the frame members and each of the support arms is connected at its inner or hub end to a disc-like hub. The first leg 38 of outer frame members connects to and radiates rotatably from a first outer hub 50, the first support arm 30 connects to and radiates rotatably from first middle hub 52, and the first leg 44 of the inner frame member connects to and radiates rotatably from first inner hub 54. The first outer, middle and inner hubs 50, 52, and 54 are aligned in facing relation with the middle hub between the inner and outer hub forming, roughly, a cylinder. The first outer, middle and inner hub 50, 52 and 54 are part of the first hub assembly 34.

The second leg 40 of the outer frame member 26 connects to and radiates rotatably from a second outer hub 56, the second support arm 32 connects to and radiates rotatably from a second middle hub 58, and the second leg 46 of inner frame member 28 connects to and radiates rotatably from a second inner hub 60. The second outer, middle and inner hubs 56, 58 and 60 are also aligned in facing relation with the middle hub between the outer and inner hubs forming, roughly, a second cylinder The second outer, middle and inner hubs 56, 58 and 60 are part of the second hub assembly 36.

In its folded or storage state, shown in FIG. 3, the hub assemblies 34, 36 appear as two cylinders separated by a space and lying along a common axis. Each hub assembly defines three smaller cylinders or hubs, an outer hub, a middle hub and an inner hub aligned end-to-end. The hub assemblies are arranged as mirror images such that the first and second inner hubs are closest together and the first and second outer hubs are farthest apart.

The legs 38, 40 and first crossbar 42 of the outer frame member define substantially a first plane. The legs 38, 40 of the outer frame member depend in this plane radially from the outer hubs 50, 56. The legs 38, 40, 44, 46 are substantially perpendicular to the axis defined by the hub assemblies. The legs 44, 46 and crossbar 48 of the inner frame member 28 define substantially a second plane. The legs 44, 46 of the inner frame member 28 depend in this plane radially from the inner hubs 54, 60. When the outer frame member 26 and the inner frame member 28 radiate in the same direction from the hubs and substantially within the same plane, then the inner frame member 28 lies substantially within the space defined by the outer frame member 26.

The support arms 30, 32 depend radially from the middle hubs 52, 58, respectively, and define planes substantially perpendicular to the axis defined by the hub assemblies The support arms 30, 32 are of a length such that when they radiate in the same direction and substantially within the plane defined by the outer frame member, they lie within the space defined by the outer frame member 26. Essentially, the support arms 30, 32 are shorter in length than the legs 38, 40 of the outer frame member. Thus it may be understood that in the collapsed or storage state, the inner frame member 28 and the support arms 30, 32 all lie substantially within the space defined by the outer frame member 26. The assembly is compact for easy storage and shipment.

The first hub assembly is shown in cross-section in FIG. 6. The second hub assembly is the mirror image of the first hub assembly and will not be described further. A rod or first bolt 62 passes centrally through first outer, middle and inner hubs 50, 52 and 54. Each of the first hubs may rotate about this central bolt.

The hubs of a hub assembly may be rotated independently about the bolt and disengagedly locked in various rotational relationship such that the frame members and support arms are positioned in various angular relationships to one another. The hubs have teeth or mating castellations 66 on their facing surfaces which, when engaged, lock the hubs in position at the desired rotational relationship. The castellations form alternating projections and projection receiving channels in between the projections. The projections on one hub mate with the projection receiving channels on the mating hub. The teeth are sized to allow small incremental adjustments of the rotational relationship between the various hubs Preferably there are at least 20 castellations and most preferably there are 30 castellations evenly spaced circumferentially about the facing surfaces of the hubs to provide for small incremental adjustments of about 12°.

A preferred attachment of the frame members and support arms to their respective hubs is as follows. The first leg 38 of outer frame member 26 is captured within a channel into first outer hub 50, first support arm 30 is captured within a channel into first middle hub 52 and first leg 44 of inner frame member 28 extends through a channel into first inner hub 54. First bolt 62 extends centrally through the aligned hubs. First bolt 62 also passes through the hub end of the legs of the frame members and through the hub end of the support arm disposed internally of the hubs Thus, in addition to providing an axis about which the hubs rotate, the bolt secures the legs of the frame members and the support arm to the hubs.

The first bolt 62 has a head end 68 and a threaded end 70. A first gripping disc 72 is connected to the head end 68 of the first bolt 62 such that rotating the gripping disc translates rotational force to the first bolt 62. A second gripping disc 74 is connected to a threaded nut 76 having threads that mate with the threaded end 70 of the first bolt 62. Rotation of the second gripping disc 74 causes rotation of the threaded nut. The gripping discs 72, 74 sandwich the aligned outer middle and inner hubs. The gripping discs are provided with alternating ridges or grooves 77 to allow a person to apply a firm grip to the gripping disc.

When a rotational force is applied to the gripping discs to cause the nut to be threaded onto the threaded end of the first bolt 62, the gripping discs 72, 74 are brought closer together. The inner face 78 of the first gripping disc 72 contact may be moved to the outer face 80 of the first outer hub 50 and the inner face 82 of the second gripping disc 74 contact may be moved to the outer face 84 of the first inner hub 54. As the gripping discs come together, they force the hubs closer together causing the castellations 66 to mate in their locked position. Likewise, by rotating the gripping discs such that the discs are moved apart from one another, the forces holding the mating castellations of the hubs in locked position are released. The hubs may be separated disengaging the mating castellations 66 and the hubs then may be rotated to a different position. In the most preferred embodiment, the frame members and hubs are sized such that the castellations are not engaged when no force is applied by the gripping discs. Bringing the gripping discs together forces the legs of the outer frame member together and/or spreads the legs of the inner frame apart and brings the castellations into mating engagement. When the discs are moved apart, the legs of the outer frame member spread apart resuming their resting position and/or the legs of the inner frame member come together resuming their resting position In this manner, the hubs attached to the legs of the frame members are drawn apart to separate the mating castellations from locking engagement.

Referring now to FIGS. 2 through 5, the support arms include spacer brackets 86 which act to locate the bike frame 88 (FIG. 2) at a particular position along the support arm. The spacer bracket is essentially a clamp which may be slip-fit over the support arm. A spacer bracket has two legs 90 joined by a nut and bolt arrangement 92. Tightening the nut and bolt arrangement clamps the spacer bracket 86 tightly and immovably at a position along the support arm. Loosening the nut and bolt arrangement allows he spacer racket 86 to be moved along the support arm to another position. The spacer bracket 86 also includes a slot 94 for receiving an elastic tie cord 96 and a lip 98 for engaging a handle 100 attached to the end of the elastic tie cord 96.

In the most preferred embodiment, each of the support arms includes at least one spacer bracket 86 and each of the middle hubs from which the support arms radiate includes a lug 102 through which the cord 96 may pass (FIG. 7). The handle 100 at one end of an elastic tie cord is engaged by a lip 98 of a first spacer bracket 86 on the first support arm. The tie cord passes through the slot 94 on the spacer bracket 86 and extends through a first lug 102 on the first middle hub. Then the tie cord extends through a second lug 102 on the second middle hub and finally through the slot on a spacer bracket secured to the second support arm. A second handle 106 at the opposite end of the elastic tie cord 96 secures this opposite end to the spacer bracket 104 on the second support arm. In this manner, the elastic tie cord is integral with the carrier and may be wrapped around the frame of the bike to secure the bike in position by engaging the handles with the lips of the brackets, without the use of knots.

Also in the preferred embodiment, the inner hubs include second lugs 108 for securing a pouch 110 in the space defined substantially by the inner frame member.

Pads 112 are disposed on the crossbars 42, 48 so that the carrier does not scratch the surface of the motor vehicle to which it is secured.

Referring back to FIG. 1, outer frame member 26 and inner frame member 28 are locked by the hub assemblies to one another at an obtuse angle. The pads 112 of the crossbar 42 of the outer frame member are positioned to lie on the window portion 114 of a hatchback lid and the pads 112 of the crossbar 48 of the inner frame member are positioned to lie on a lower frame portion 116 of the hatchback lid. An upper strap 16 extends from the crossbar 42 of the outer frame member to an outer edge 24 of the hatchback lid above the window. Side straps 18 extend from third lugs 118 integral with the outer hubs to attachment points on the outer edge 24 of the hatchback lid on opposite sides of the window portion or below the window portion (not shown). The support arms are disposed about horizontally for supporting the frame of a bicycle.

Figure 2:
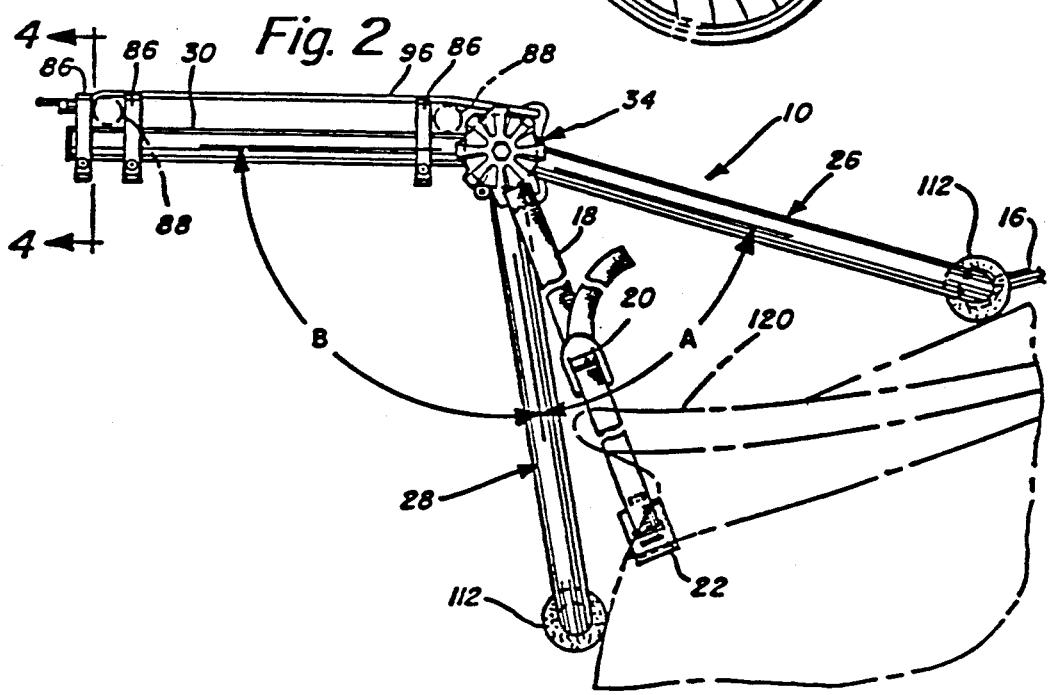
FIG. 2 is a side view showing the carrier attached to the back of a motor vehicle having a spoiler.

Because the frame members and the support arms of the carrier 10 can be disposed at virtually any angle relative to one another, the carrier 10 may be secured to virtually any motor vehicle. FIG. 2 shows the carrier 10 secured to a vehicle having a spoiler 120. The outer frame member 26 and the inner frame member 28 are locked in position at an acute angle such that the frame members surround but do not contact or damage the spoiler. Again, the support arms may be positioned to radiate horizontally from the hub assemblies.

In the preferred embodiment the hubs, brackets and gripping discs are molded plastic pieces and the support arms and frame members are lengths of metal tubing.

It should be understood that various changes and modifications of the embodiment shown in the drawings may be made within the scope of this invention. Thus, it is intended that all matter contained in the above description or shown in the accompanying drawings shall be interpreted in an illustrative and not limiting sense.

What is claimed is:

1. In a collapsible carrier for use on the rear portion of a motor vehicle, the carrier adapted to be positioned in a storage position and in various use positions, and further adapted to support a bicycle when positioned on a motor vehicle in one of the use positions, the improvement comprising,
a first frame member having attached to it a first frame hub having a first frame hub radius and projections for interengagement with another hub, and wherein the frame member is captured within a channel in the frame hub.

2. The improvement of claim 1 further comprising a rod extending through both the frame hub and the frame member.

3. The improvement of claim 1 further comprising a gripping disc positioned in face to face relation with the first frame hub, the gripping disc constructed and arranged to provide a hand gripping surface.

4. The improvement of claim 1 further comprising a threaded bolt extending through both the frame hub and the frame member, thereby securing the frame hub to the frame member and providing an axis about which the frame member rotates.

5. The improvement of claims 1 or 4 wherein the projections on the hub are defined by castellations arranged about the radius of the hub.

6. The improvement of claim 4 further comprising a gripping disc attached to the bolt, the gripping disc constructed and arranged to provide a hand gripping surface.

7. The improvement of claim 1 further comprising an arm hub attached to an arm and having an arm hub radius, the arm hub positioned in face to face relation with the frame hub, and wherein the frame hub radius and arm hub radius are aligned.

8. The improvement of claim 7 further comprising a threaded bolt extending through both the frame hub and the frame member, thereby securing the frame hub to the frame member and providing an axis about which the frame member rotates.

9. The improvement of claim 7 further comprising projection receiving channels arranged about the arm hub radius for interengagement with the frame hub projections to secure the hubs in the storage and various use positions.

10. The improvement of claim 9 wherein the projections and projection receiving channels are defined by mating castellations on facing surfaces of the hubs.

11. The improvement of claim 1 further comprising a second frame member attached to a second frame hub having a second hub radius, the second frame hub positioned in face to face relation with the first frame hub, and wherein the second frame member is captured within a channel in the second frame hub.

12. The improvement of claim 11 further comprising a threaded bolt extending through each of the frame hubs and frame members.

13. The improvement of claim 11 further comprising projection receiving channels arranged about the second frame hub radius for interengagement with the first frame hub projections to secure the hubs in the storage and various use positions.

14. The improvement of claim 13 wherein the projections and projection receiving channels are defined by mating castellations on facing surfaces of the hubs.

15. The improvement of claim 11 further comprising
   a threaded bolt extending through each of the frame hubs and frame members, and
   a gripping disc attached to the bolt, the gripping disc constructed and arranged to provide a hand gripping surface.

16. The improvement of claim 15 wherein the gripping disc is attached to a head of the bolt, whereby hand rotation of the gripping disc translates rotational force to the bolt.

17. The improvement of claim 15 wherein the gripping disc is attached to a threaded end of the bolt whereby hand rotation of the gripping disc advances the gripping disc on the bolt.

18. In a collapsible carrier for use on the rear portion of a motor vehicle, the carrier adapted to be positioned in a storage position and in various use positions, and further adapted to support a bicycle when positioned on a motor vehicle in one of the use positions, the improvement comprising,
   an arm for supporting a bicycle, the arm having attached to it an arm hub and projections for interengagement with a frame hub, and wherein the arm is captured within a channel in the arm hub.

19. The improvement of claim 18 further comprising a rod extending through both the arm hub and arm.

20. The improvement of claim 18 further comprising a gripping disc positioned in face to face relation with the arm hub, the gripping disc constructed and arranged to provide a hand gripping surface.

21. The improvement of claim 18, wherein the rod is a threaded bolt extending through both the arm and the arm hub.

22. The improvement of claim 21 further comprising a gripping disc attached to the bolt, the gripping disc constructed and arranged to provide a hand gripping surface.

23. The improvement of claims 18 or 21, wherein the projections on the hub are defined by castellations arranged about a radius of the hub.

24. The improvement of claims 18 or 21 further comprising
   a frame hub attached to a frame member and having a frame hub radius, the frame hub positioned in face to face relation with the arm hub, and
   projection receiving channels arranged about the frame hub radius for interengagement with the arm hub projections to secure the arm and frame member in the storage and various use positions.

25. The improvement of claim 24 wherein the projections and projection receiving channels are defined by mating castellations.

26. In a collapsible carrier for use on the rear portion of a motor vehicle the carrier adapted to be positioned in a storage position and in various use positions, and further adapted to support a bicycle when positioned on a motor vehicle in one of the use positions, the improvement comprising,
   an arm for supporting a bicycle, the arm having attached to it an arm hub having a radius, wherein the arm extends into a channel in the hub,
   means for securing the arm within the channel, and
   means associated with the arm hub and arranged about the radius for selectively securing the arm in the storage and in the various use positions.

27. In a collapsible carrier for use on the rear portion of a motor vehicle, the carrier adapted to be positioned in a storage position and in various use positions, and further adapted to support a bicycle when positioned on a motor vehicle in one of the use positions, the improvement comprising,
   an arm for supporting a bicycle, the arm having attached to it an arm hub, wherein the arm is captured within a channel in the arm hub, and
   a rod extending through both the arm hub and the arm, thereby securing the arm to the arm hub, and wherein the hub rotates about the axis defined by the rod.

28. The improvement of claim 27 further comprising a frame hub attached to a frame member and positioned in face to face relation with the arm hub, and wherein the rod extends through the frame hub, whereby the arm hub may be rotated relative to the frame hub into the storage and various use positions.

29. The improvements of claims 27 or 28 wherein the rod is a threaded bolt.

30. A carrier for use on the rear portion of a motor vehicle and further adapted to be secured in a storage and in various use positions comprising,
   a pair of hub assemblies axially aligned along a common axis, each hub assembly including hubs capable of rotating independent of one another about the common axis, the hubs having interlocking surfaces providing for incremental adjustment and locking of the hubs in various rotational relationships with respect to one another,
   frame members connected to and radiating from the hub assemblies, wherein each of the frame members includes a pair of legs radiating perpendicularly to the axis of the hub assemblies and a cross bar connecting the legs to one another, each of the frame members having a resting position, and wherein the frame members are sized such that a force is required to bring the interlocking surfaces of the hubs together to engage the interlocking surfaces, and means for applying said force, wherein the frame members are constructed such that they resume their resting position when the force is released, thereby separating the interlocking surfaces of the hubs to disengage the interlocking surfaces of the hubs.

31. A carrier as claimed in claim 30 wherein the means for applying the force includes gripping discs sandwiching the hubs, the gripping discs constructed to provide hand gripping surfaces.

32. A carrier as claimed in claim 30 wherein the means for applying the force includes a threaded bolt and nut.

33. A carrier as claimed in claim 30 wherein the means for applying the force includes a pair of grippings discs sandwiching the hubs in the hub assembly, a pair of threaded bolts, one each passing centrally through each hub assembly, and a pair of nuts threaded on the end of each of the bolts, whereby advancing the nuts on the bolts causes each pair of grippings discs to move together to cause the interlocking surfaces of the hubs to move together.

34. A carrier as claimed in claim 30 wherein the means for applying the force includes a threaded bolt and a gripping disc attached to the threaded end of the bolt, the gripping disc having a hand gripping surface, whereby the gripping disc may be rotated to advance the gripping disc onto the threaded bolt.

35. A carrier as claimed in claim 30 wherein the frame members are captured within channels in the hubs.

36. A carrier as claimed in claim 35 further comprising a pair of threaded bolts, one each associated with a hub assembly, the bolts passing through the hubs of each hub assembly and through the frame members within the channels of the hubs.

37. A carrier for use on the rear portion of a motor vehicle and further adapted to be secured in a storage and in various use positions comprising, a pair of hub assemblies axially aligned along a common axis, each hub assembly including hubs capable of rotating independent of one another about the common axis, the hubs having interlocking surfaces providing for incremental adjustment and locking of the hubs in various rotational relationships with respect to one another, frame members connected to and radiating from the hub assemblies, and means for detachably securing the interlocking surfaces of the hubs in various rotational relationships, wherein the means for detachably securing the interlocking surfaces includes gripping discs sandwiching the hubs in each hub assembly, a pair of threaded bolts, one each passing centrally through each hub assembly, and a nut threaded onto each of the bolts, whereby advancing the nuts onto the bolts causes the gripping discs to move together to cause the interlocking surfaces of the hubs to interlock.

38. A carrier as claimed in claim 37 wherein the gripping discs are connected to the nuts and bolts, whereby rotation of the gripping discs translates rotational force to the bolts and nuts.

39. A carrier for use on the rear portion of a motor vehicle and further adapted to be secured in a storage and in various use positions comprising, a pair of hub assemblies axially aligned along a common axis, each hub assembly including hubs capable of rotating independent of one another about the common axis, the hubs having interlocking surfaces providing for incremental adjustment and locking of the hubs in various rotational relationships with respect to one another, frame members connected to and radiating from the hub assemblies, and means for detachably securing the interlocking surfaces of the hubs in various rotational relationships, wherein the means for detachably securing the interlocking surfaces includes a threaded bolt and a gripping disc attached to the threaded end of the bolt, the gripping disc having a hand gripping surface, whereby the gripping disc may be rotated to advance the gripping disc onto the threaded bolt.

40. A carrier for use on the rear portion of a motor vehicle and further adapted to be secured in a storage and in various use positions comprising, a pair of hub assemblies axially aligned along a common axis, each hub assembly including a plurality of hubs capable of rotating independent of one another about the common axis, the hubs having interlocking surfaces providing for incremental adjustment and locking of the hubs in various rotational relationships with respect to one another, means for detachably securing the interlocking surfaces of the hubs in various rotational relationships, frame members connected to and radiating from the hub assemblies, a pair of threaded bolts, one each passing centrally through each hub assembly and providing an axis about which the hubs may rotate, and a pair of nuts, one each for each of the bolts, whereby advancing the nuts on the bolts causes the interlocking surfaces of the hubs to move together and interlock.

41. A carrier as claimed in claim 40 wherein the frame members are connected to the hubs at least in part through the threaded bolts.

42. In a collapsible carrier for use on the rear portion of a motor vehicle, the carrier adapted to be positioned in a storage position and in various use positions, and further adapted to support a bicycle when positioned on the rear of the motor vehicle in one of the use positions, the improvement comprising, a pair of axially aligned hub assemblies for carrying members, each hub assembly including a plurality of hubs capable of rotating independently of one another about a common axis, means for securing the hubs in various rotational relationships with respect to one another, the means for securing including grippings disks sandwiching the hubs in each hub assembly, whereby the carrier may be positioned in the storage and the various use positions, and a pair of threaded bolts, one each passing centrally through each hub assembly, and a nut threaded onto each of the bolts, whereby advancing the nuts onto the bolts causes the gripping disks to move together to cause interlocking surfaces of the hubs to interlock.

* * * * *

UNITED STATES PATENT AND TRADEMARK OFFICE
CERTIFICATE OF CORRECTION

PATENT NO. : 5,056,699

DATED : October 15, 1991

INVENTOR(S) : Dixon Newbold and Ned Levine

It is certified that error appears in the above-indentified patent and that said Letters Patent is hereby corrected as shown below:

Column 8, line 24, replace "into" with --through--.

Signed and Sealed this

Twenty-sixth Day of October, 1993

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,056,699

DATED : October 15, 1991

INVENTOR(S) : Dixon Newbold and Ned Levine

It is certified that error appears in the above-indentified patent and that said Letters Patent is hereby corrected as shown below:

Column 7, line 62, replace "18" with --19--.

Signed and Sealed this

Seventh Day of December, 1993

Attest:

BRUCE LEHMAN

Attesting Officer

Commissioner of Patents and Trademarks